United States Patent

Gerardus et al.

Patent Number: 5,181,262
Date of Patent: Jan. 19, 1993

[54] DIGITAL OPTICAL SWITCH

[75] Inventors: Johannes J. Gerardus, Zoetermeer; Doeke K. Doeksen, Haarlem, both of Netherlands

[73] Assignee: Koninklijke Ptt Nederland N.V., Groningen, Netherlands

[21] Appl. No.: 698,444

[22] Filed: May 10, 1991

[30] Foreign Application Priority Data

May 17, 1990 [NL] Netherlands .................. 9001157

[51] Int. Cl.$^5$ ............................ G02B 6/26; G02B 6/42
[52] U.S. Cl. ............................................ 385/16; 385/9
[58] Field of Search ................................ 385/16, 8, 9

[56] References Cited

U.S. PATENT DOCUMENTS 5,058,972 10/1991 Erman et al. ........................ 385/16

FOREIGN PATENT DOCUMENTS

WO8807220 9/1988 Int'l Pat. Institute .
61-3584 7/1987 Japan .

OTHER PUBLICATIONS

Dutch Novelty Search Report (International type).
Optical Society of America, "Optical Fiber Communication Conference & Sixth International Conference on Integrated Optics and Optical Fiber Communication Technical Digest" Jan. 1987, 2 pages.
M. Heiblum et al., "Analysis of Curved Optical Waveguides by Conformal Transformation", vol. QE-11, No. 2, Feb. 1975, pp. 75–83.

Primary Examiner—John D. Lee
Assistant Examiner—Robert E. Wise
Attorney, Agent, or Firm—Frishauf Holtz Goodman & Woodward

[57] ABSTRACT

In a digital optical switch which is based on the mode-selectivity principle, made up of a passive section (A) containing a first optical wave guide (1) and a second optical wave guide (2) and a switching section (B) containing a third optical wave guide (3) and a fourth optical wave guide (4), both the required asymmetry and the bringing of the optical wave guides within or outside each other's interaction region are achieved with the aid of curves ($K_1$, $K_2$) in respective walls of the optical wave guides. In the switching section (B) said asymmetry is reversible. Use is made of the effect that a curved wall results, in general, in a reduction of the propagation constant in the optical wave guide. Suitable curves are of circular-arc shape and sinusoidal. The switching section (B) may furthermore incorporate a short intermediate section (s-u) in which the optical wave guides (12, 13) run straight at a small mutual angle ($\Phi$) in the event that the reversible asymmetry is in the first instance too small with a particular choice of material. The invention makes possible much shorter switches which have a greater packing density.

9 Claims, 1 Drawing Sheet

DIGITAL OPTICAL SWITCH

BACKGROUND OF THE INVENTION

1. Field of the Invention

The invention is in the field of integrated optics. More particularly it refers to a digital optical switch based on the mode-selectivity principle.

2. Prior art

A digital electro-optical switch is disclosed by references [1] and [2] (see below). The switching action is obtained in said known switch with the aid of so-called mode selectivity. Mode selectivity is the phenomenon that a light mode which is propagated in an optical wave guide, from a point where more than one mode can be propagated, only that mode is excited and propagated whose propagation velocity is best suited to the propagation velocity of said light mode. To be able to generate only one particular mode simultaneously in the switch, a certain asymmetry is required at the input. This known digital electro-optical switch, which is produced on a lithium niobate substrate, possesses said asymmetry in two optical wave guiding input channels of different width, while the output is formed by two optical wave guiding output channels of identical width. The input channels converge at an angle, which has to be less than 0.1°, up to a point within their interaction region, while the output channels diverge again at the same angle up to a point outside their interaction region. As a result of a switching voltage applied over electrodes placed in the vicinity of said interaction region and the output channels, the light propagation therein can be influenced electro-optically, in this case, can be switched. This implies that each mode generated in the interaction region can be guided to one of two outputs. A good switching action which is sufficiently polarisation- and wavelength-independent and has a low crosstalk can indeed thereby be obtained. However, a disadvantage is that said digital switch takes up a fairly large space as a component in a matrix of switches owing to its relatively large length as a consequence of the very acute angle ($\leq 0.1°$) between the straight input channels. Said acute angle also imposes high requirements on the lithography during the production of the component.

SUMMARY OF THE INVENTION

The object of the invention is to eliminate said disadvantages. For this purpose a digital optical switch comprising, a first section, called the input section, having a first, incoming, optical wave guide and a second, incoming, optical wave guide, which optical wave guides have a mutually approaching path up to a point within their interaction region, a second section, called the output section, having a third, outgoing, optical wave guide and a fourth, outgoing, optical wave guide, which optical wave guides have a mutually receding path up to a point outside their interaction region, the optical wave guides of the second section connecting to those of the first section, and means of controllably influencing the light propagation state in at least one of the optical wave guides in one of the sections, the optical wave guides both in the input section and in the output section mutually exhibiting, in their light propagation state, an asymmetry which is switchable at least in one of the sections, called the switching section, or is generated by said first means, has, according to the invention, the characteristic that the optical wave guides of the first section incorporate a first converging curve which brings the first and second optical wave guides within each other's interaction region, and that the optical wave guides of the second section incorporate a first diverging curve which brings the third and fourth optical wave guides outside each other's interaction region, the asymmetry essentially being achieved, at least in the section which is not the switching section, by the first curve incorporated therein.

The invention is founded on the insight that, in a digital optical switch which is based on the mode-selectivity principle, the required asymmetry and the bringing of the optical wave guides within or outside each other's interaction region can be achieved by one and the same measure, namely by using curves. In this connection it makes use of the fact, known per se from reference [3] (see FIG. 7 in conjunction with equation (28) and the associated text), that the propagation constant of an optical wave guide bent in accordance with a circular arc differs from, and is in this case lower than, that of a straight but otherwise identical optical wave guide. Although it is known that curves in optical wave guides in general cause a severe attenuation of a light signal propagated therein, it has been found experimentally that, to achieve the desired asymmetry, curves can be chosen which have a smallest radius of curvature limited in a manner such that, on the one hand, the attenuation is still acceptable and, on the other hand, the optical wave guides, viewed in the longitudinal direction, can be brought within or outside, respectively, each other's interaction region over a much shorter distance, so that the actual switching component can become appreciably shorter. As a result of using such a curve in the passive section, i.e. the section which is not the switching section, a reduction in length of almost a factor of 2 can be achieved with respect to the known digital optical switch. Use thereof also in the switching section increases the reduction factor appreciably. A geometry having curves permits a denser packing of a multiplicity of such switches or of a combination with other components, and is, in addition, much less critical in a specific design, which simplifies the production of such a component.

BRIEF DESCRIPTION OF THE DRAWING

The invention will be explained in more detail with reference to the drawing, wherein.

REFERENCES

Figure 1A:
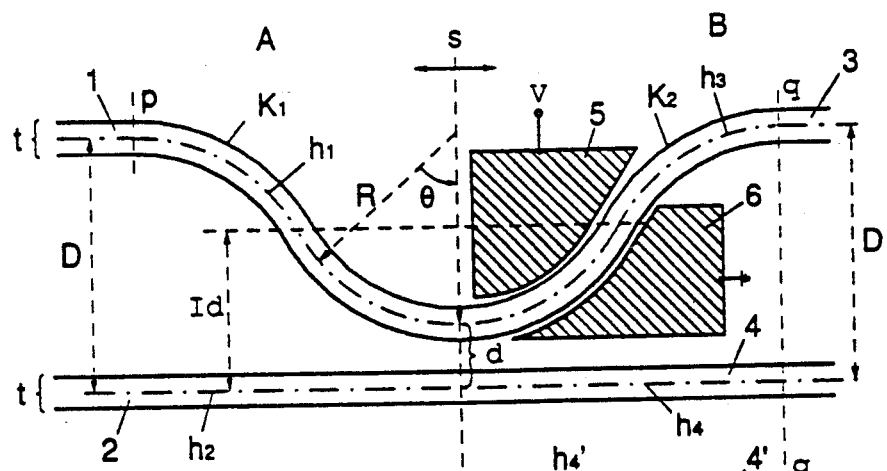
FIGS. 1(a), 1(b), 1(c), and 1(d) show diagrammatically and viewed in plan view, a digital optical switch according to the invention having a static asymmetric input section A and a switchable output section B in a first variant (FIG. 1(a)), in a second variant (FIG. 1(b)) which is a mirror image with respect to the first variant, in a third symmetrical variant (FIG. 1(c)), and in a fourth variant (FIG. 1(d)).

[1] PCT publication WO 88/07220 entitled: Electrooptical switch;

[2] Y. Silberberg, P. Perlmutter and J. E. Baran: "Digital optical switch", Appl. Phys. Lett. 51(16), Oct. 19, 1987, p. 123-1232;

[3] M. Heiblum and J. H. Harris: "Analysis of curved optical wave guides by conformal transformation", IEEE Journ. Quant. Electr., Vol. QE-11, No. 2, Feb. 1975, p. 75-83.

DESCRIPTION OF EXEMPLARY EMBODIMENTS

A digital optical switch based on the mode-selectivity principle is in fact a series circuit of two asymmetrical sections, viz. an input section which brings two optical wave guides within each other's interaction region and an output section which brings the two optical wave guides outside each other's interaction region again, the asymmetry of at least one of the sections being switchable in sign to obtain the switching action. The asymmetry in the input section makes said section into a mode filter which is necessary in the output section in order to be able to guide the mode generated with said mode filter in the interaction region in various output directions. It is not important for the switching action whether the output section or the input section is switchable.

Reference [3] discloses that the propagation constant $\beta$ of an optical wave guide having a step index profile which incorporates a curve which is composed of a circular arc is given in a first order approximation by:

$$\beta = \beta_o(1 - t/(2R)) \quad (1)$$

in which $\beta_o$ is the propagation constant of a straight optical wave guide having the same refractive index profile, t is the width of the optical wave guide and R is the radius from the circular arc to the center of the optical wave guide. If a first optical wave guide having a propagation constant $\beta_1$ and provided with such a circular arc enters, as a result thereof, the interaction region of a second, straight optical wave guide having propagation constant $\beta_2$, an effective difference $\beta_{eff}$ in propagation constant between the two optical wave guides can be defined by:

$$\Delta\beta_{eff} \Delta\beta - \beta_1 * t/(2R) \quad (2)$$

in which $\Delta\beta = \beta_1 - \beta_2$ is the difference in propagation curve, such as refractive index differences or width differences between the two optical wave guides. If there are no differences apart from the curve, then $\Delta\beta = 0$, and the degree of asymmetry which exists as a result of the curve in the assembly, now considered as a system, of the two optical wave guides, is determined by the remaining term in equation (2). With suitable choice of the material of the optical wave guides or of their surroundings, influencing the light propagation in one or both optical wave guides within said system by means of electro-optical, thermo-optical, opto-optical, etc, effects may render said $\Delta\beta \neq 0$, and even in a manner such that the asymmetry expressed by $\Delta\beta_{eff}$ remains, in absolute value, approximately the same but reversed in sign. This circumstance implies that both a static (i.e. non switchable) and a switchable asymmetrical section, as is necessary to produce said digital optical switch, can be achieved by means of such a system. A reduction of the propagation constant in an optical wave guide in accordance with equation (2) occurs not only as a consequence of a circular curve, but also occurs more generally as a consequence of curves having a radius of curvature which is variable, but always finite, over the curve.

Figure 1B:
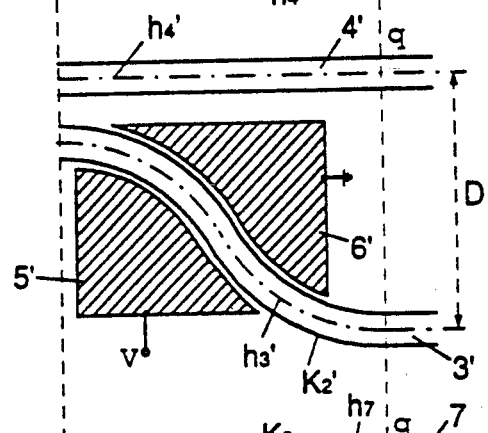

FIG. 1(a) shows diagrammatically and seen in plan view, such an optical switch according to the invention which comprises a static asymmetrical input section A on the left of a broken dashed line s and a switchable asymmetric output section B, connected directly thereto, on the right of the broken dashed line s. The input section A is formed by optical wave guides 1 and 2, respectively, having center lines (dash-and-dot lines) $h_1$ and $h_2$, and the output section B by two optical wave guides 3 and 4, respectively, having center lines $h_3$ and $h_4$ which connect to the optical wave guides 1 and 2, respectively, at the broken dashed line s shown in the figure. All the optical wave guides have a width t. Viewed from left to right, the optical wave guides 1 and 2 initially run parallel at a center-to-center distance D, between the center lines $h_1$ and $h_2$, which is at least great enough for no noticeable mutual influencing of the light propagation in the optical wave guides to take place. Starting from a broken dashed line p, the optical wave guide 1 approaches the straight optical wave guide 2 as a result of a more or less S-shaped curve $K_1$, reaching a center-to-center distance d which is less than, or equal to, an interaction distance $I_d$, i.e. the maximum center-to-center distance of the optical wave guides 1 and 2 within which noticeable mutual influencing does take place. On the right of the broken dashed line s, a similar S-shaped curve $K_2$ in the optical wave guide 3 moves the latter away from the straight optical wave gain 4 again until a center-to-center distance $D > I_d$ is reached. In the present example, the curve $K_2$ has a shape which is the mirror image of the curve $K_1$ with respect to the broken dashed line s, so that the optical wave guide 3 again runs parallel to the optical wave guide 4 at distance D beyond the curve $K_2$, starting from what is indicated in the figure by a broken dashed line q. Of course, only that part of the curve $K_1$ or $K_2$ which is within the interaction distance $I_d$ is important for the asymmetry. The S shape has, however, been Chosen for the curves $K_1$ and $K_2$ as the most suitable transition between optical wave guides running parallel (a configuration most used in practice because it is the one occupying the least space) and the interaction region determined by the interaction distance $I_d$. The S shape can be assembled from two oppositely curved circular arcs, each having a radius of curvature R (from the center line) and a central angle 8. Said circular arcs may, however, also be chosen differently. The S shape can equally be chosen as sinusoidal. This may be advantageous in designing a specific switch since a sinusoid has one more degree of freedom, viz. the period and the amplitude, than a circle, which is determined by the radius. In addition, the S shape, instead of being composed of a period of a specific sinusoid, may also be assembled from two half periods of two different sinusoids. Situated on either side of the curve $K_2$ are means which are indicated in the present example as electrodes 5 and 6 and with which it is possible to influence the refractive index in the optical wave guide 3 at the position of the curve $K_2$ from the outside. Said means are dependent on the effect on the basis of which the refractive index in the curve $K_2$ can be altered instantaneously, and this again depends on the choice of the material of which the optical wave guide and/or its enclosing surroundings is made. If the material is electro-optical, the means are electrodes and a voltage can be applied across them to generate an electrical field in the electro-optical material. The means are also electrodes if semi-conductor material is used in which the change in refractive index can be brought about by means of charge carrier injection. If the material is thermo-optical, said means are heating elements with which the surrounding temperature of the guide 3 can be adjusted at the position of the curve. If the material is piezo-optical, i.e. if the refractive index is a function of the pressure exerted on the material, piezoelectric materials which are able to bring about a mechanical deformation of the piezo-optical material under the influence of an electrical field may, for example, be used for said means as a surrounding of the curve $K_2$ of the guide 3. Depending on the chosen material and the sign of the change in refractive index (i.e. increase and/or decrease) which can be achieved in the material with said means, instead of being installed in the curve, the means may also be installed in a manner such that the propagation constant of both optical wave guides 3 and 4, or only that of the optical wave guide 4, may be influenced within the interaction region. The optical wave guides themselves may be installed on a support or a substrate. They may have a "step index" profile or a "graded index" profile. The optical wave guides may also be conventional glass fibers which are embodied in a well-defined "fused coupling", so that, viewed in section, the path of the cores of said glass fibers corresponds to that of the optical wave guides 1 to 4 inclusive in FIG. 1(a). Without a limitation of the invention thereby being intended, electrodes will be assumed for electro-optically influencing the switching action in an electro-optical material in the further description with reference to FIG. 1. The switching in accordance with FIG. 1(a) operates as follows. An optical signal entering via optical wave guide 1 will, as a consequence of the lower propagation constant in the curve $K_1$, excite the odd mode in the interaction region of the optical wave guides 1 and 2. This odd mode signal will then be propagated in the optical wave guide of the two optical wave guides 3 and 4 which has the lowest propagation constant at that instant. If there is no voltage across the electrodes 5 and 6, then that is the optical wave guide 3 as a consequence of the curve $K_2$. If, however, there is a voltage V having the correct sign across the electrodes 5 and 6, the refractive index in the curve $K_2$ is increased as a consequence of the electro-optical effect in a manner such that the propagation constant therein is now greater than that in the optical wave guide 4. The optical signal corresponding to the odd mode in the interaction region will now be propagated via the optical wave guide 4. An optical signal entering along optical wave guide 2 will excite the even mode in the interaction region. The optical signal corresponding to said mode will be further propagated along that optical wave guide of the optical wave guides which has the highest propagation constant at that instant, which is again dependent on the switching voltage which is then across the electrodes 5 and 6. Instead of the output section B as shown in FIG. 1(a), it is also possible to choose an output section B according to FIG. 1(b) which is the mirror image thereof. Corresponding components are therefore provided with identical numbering therein, but with a prime. The action of a switch so constructed is exactly identical to that according to FIG. 1(a) with the proviso that a signal which is propagated in the first switch via the optical wave guide 3 or 4, respectively, will be propagated in the second switch via the optical wave guide 3' or 4'.

Figure 1C:
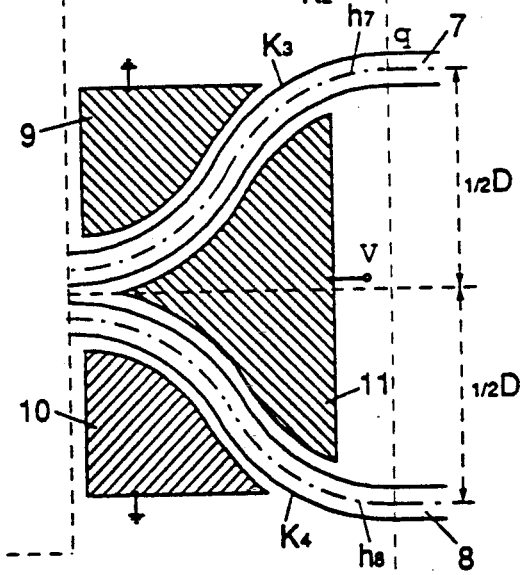

A third possibility for an output section B is shown in FIG. 1(c). This section has been chosen as completely symmetrical. The outgoing optical wave guides 7 and 8 incorporate, respectively, mutually identical but divergent curves $K_3$ and $K_4$. Positioned at the outside edges of the curves $K_3$ and $K_4$ are electrodes 9 and 10 and positioned between the curves $K_3$ and $K_4$ is an electrode 11 which can interact with the electrodes 9 and 10. The electrodes 9 and 10 are, for example, connected to earth as shown, while the switching voltage, $+V$ or $-V$, can be applied to the electrode 11. Since the section is geometrically completely symmetrical, the curves with their reduction in the propagation constant do not now contribute to an asymmetry in the output section. Said asymmetry is now brought about by the difference in the direction of the electric fields which are brought about between the respective electrode pairs (9, 11) and (10, 11), which difference results in a change in refractive index of different sign and changes, corresponding thereto, in the propagation constant of the respective curves $K_3$ and $K_4$.

An output section which is asymmetrical as regards geometry has the advantage that, in the absence of a switching voltage, there is a defined output state. An advantage of an output section which is symmetrical as regards geometry and therefore switchable is that the switching voltage can be smaller by half in absolute value, while the curves $K_3$ and $K_4$ can have a greater radius of curvature with the length of the actual switching component remaining the same, which is, of course, somewhat more favourable with a view to attenuation.

The chosen center-to-center distance d of the optical wave guides at the position of the broken dashed line s may be either smaller than or equal to, or greater than the width t of the optical wave guides. If $d \leq t$, the switching action is in fact somewhat better; the choice of $d > t$ does, however, have the advantage that the geometry is much less critical in view of the absence of the very acute angle between the optical wave guides and lower requirements are therefore imposed on the lithography during the production of the component.

The best mode filtering occurs in general if $d \approx t$. The optical wave guides are then, however, also coupled to the greatest extent. So that said optical wave guides can escape said coupling over as short a distance as possible, they will have to diverge with a large average angle. This requires, however, a switching section with a high switchable asymmetry. If, in addition, the, for example, electro-optical effect with which the propagation constant is influenced in the switching section is fairly weak in the chosen material, such high switching voltages would be necessary to achieve a switching action which is adequate to any degree that the breakdown voltage of the material would be exceeded by far. In order to prevent this, in a preferred embodiment, each of the curves of the output section B does not connect directly to the wave guides 1 and 2 of the input section A at the dashed line s but, over a certain length, via straight optical wave guides which recede mutually at a small angle. This is shown diagrammatically in FIG. 1(d) In the latter, an output section B is again shown starting from the broken dashed line s and having two outgoing optical wave guides 12 and 13 with respective center lines $h_12$ and $h_13$. Said output section extends more or less symmetrically starting from a broken dashed line u by means of S-shaped curves $K_5$ and $K_6$ which mutually recede symmetrically and which respectively form part of the optical wave guides 12 and 13, so that said optical wave guides again run parallel at the level of the broken dashed line q at a mutual distance D. Between the broken dashed lines s and u, the optical wave guides 12 and 13 extend, respectively, in accordance with straight guide sections $L_1$ and $L_2$ at a very small mutual angle $\Phi$. Electrodes 14 and 15, respectively, flank the straight guide sections $L_1$ and $L_2$ and the curves $K_5$ and $K_6$ of the respective optical wave guides. Here only two electrodes are shown by way of example in a position partially covering the optical wave guides, these features being dependent, however, on the chosen orientation of the electro-optical material. The distance between the dashed lines s and u is such that, at the level of the dashed line u, the degree of coupling between the optical wave guides 12 and 13 in the straight guide sections $L_1$ and $L_2$ has decreased to such an extent that the required switchable asymmetry can in fact be achieved with an acceptable switching voltage V.

EXAMPLE 1

The length of a switch which has an optical wave guide path as in FIG. 1(a) or (b), in which the optical wave guides are constructed as "ridge" wave guides on a substrate of doped InP (refractive index n=3.209) in an intermediate layer of InGaAsP (refractive index n=3.352; thickness 0.45 $\mu$m) beneath a thin layer of doped InP (thickness 0.05 $\mu$m) provided with a "ridge" (1.8 $\mu$m wide, 0.15 $\mu$m thick), in which D=30 $\mu$m and d$\approx$t=1.8 $\mu$m, in which circular arcs are used having R=800 $\mu$m, and in which the change in refractive index in the curve is achieved in the switching section by means of a switchable charge carrier injection from an and beneath the substrate, can be limited to approximately 600 $\mu$m. The switchable injection will require a switching current of approximately 40 mA. With an optical signal having a wavelength of approximately 1.3 $\mu$m, the crosstalk between the optical guides in each of the two switching states will remain limited to $-20$ dB, while an additional attenuation in the respective optical wave guide as a consequence of the charge carrier injection will be 0.14 dB.

EXAMPLE 2

Figure 1D:
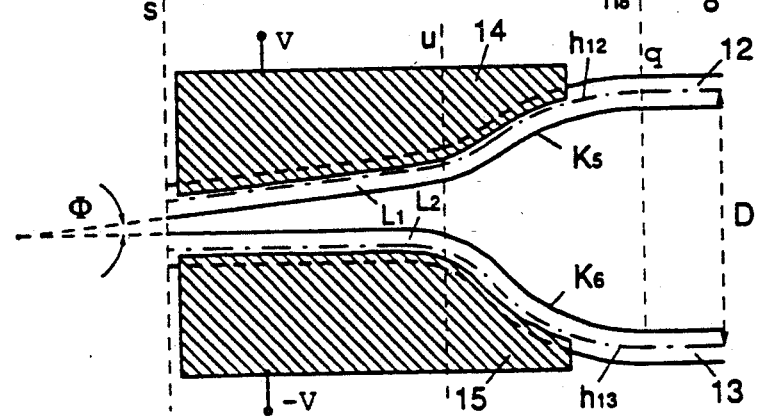

In this example, a switch has a structure corresponding to FIG. 1(d) and based on LiNbO$_3$. The optical wave guides are in this case obtained in a standard way by means of diffusion of a titanium strip 9 $\mu$m wide and 70 nm high into an LiNbO$_3$ substrate in a Z-cut orientation with propagation in the Y direction. The titanium-diffused optical wave guides thus obtained have a mutual parallel distance of D=30 $\mu$m. In the input section, the curve $K_1$ is composed of two consecutive half sinusoidal periods having respective amplitudes of 21 $\mu$m and 9 $\mu$m and respective periods of 1,250 $\mu$m and 500 $\mu$m. In the output section, the straight wave guide sections $L_1$ and $L_2$ have a length of 4.5 mm and a mutual angle $\Phi$ = 2 mrad, and each of the curves $K_5$ and $K_6$ is formed by a sinusoid having an amplitude of 10 $\mu$m and a period of 600 $\mu$m. In such a switch, the length remains limited to approximately 7 mm, the attenuation in the curve with the smallest radius of curvature is <0.61 dB for an optical signal having a wavelength of approximately 1.3 $\mu$m, and the switching voltages are 15 V for the TM-polarisation and 45 V for the TE-polarisation. The crosstalk between the optical wave guides in the output section is less than $-15$ dB in the two switching states.

We claim:

1. Digital optical switch comprising:
   a first section, hereinafter called the input section, having a first incoming optical wave guide and a second incoming optical wave guide, which optical wave guides have a mutually approaching path up to a point within their interaction region,
   a second section, hereinafter called the output section, having a third outgoing optical wave guide and a fourth outgoing optical wave guide, which optical wave guides have a mutually receding path up to a point outside their interaction region, the optical wave guides of the output section connecting to those of the input section, and
   first means for controllably influencing the light propagation state in at least one of the optical wave guides in one of said sections, the optical wave guides both in the input section and in the output section mutually exhibiting, in their light propagation state, an asymmetry which is controllable by said first means at least in one of said sections, therefore called the switching section, characterized in that
   the optical wave guides of the input section incorporate a first converging curve which brings said first and second optical wave guides within each other's interaction region,
   and in that the optical wave guides of the output section incorporate a first diverging curve which brings the third and fourth optical wave guides outside each other's interaction region,
   the asymmetry essentially being achieved, at least in the section which is not the switching section, by that one of said first curves which is incorporated therein.

2. Digital optical switch according to claim 1, characterized in that
   the asymmetry is essentially achieved respectively, in the input section and the output section, by the first converging curve and the first diverging curve, which are respectively incorporated in said input section and in said output section, and
   in that the controllable influencing of said light propagation state is switchable in the switching section by said first means, between two states in which the asymmetry of one of said states has an opposite sign in said switching section with respect to the asymmetry in the other of said states in said switching section.

3. Digital optical switch according to claim 1, characterized in that the switching section furthermore comprises a second curve of the same type, viz. converging or diverging, as the first, as a result of which the switching section is essentially symmetrical as regards geometry, and
   in that the controllable influencing of said light propagation state is switchable in the switching section by said first means, between two states in which the asymmetry in one of said states has an opposite sign in said switching section with respect to the asymmetry in the other of said states in said switching section.

4. Digital optical switch according to claim 1, 2 or 3 characterized in that the input section is the switching section.

5. Digital optical switch according to claim 1, 2, or 3 characterized in that at least that part of at least one of the said curves, with which part the curve connects to the interaction region, is of circular-arc shape.

6. Digital optical switch according to claim 1, 2, or 3 characterized in that at least that part of at least one of the said curves, with which part the curve connects to the interaction region is sinusoidal.

7. Digital optical switch according to claim 1, characterized in that the said curves respectively end and begin in a sectional plane in which the first section and the second section connect to each other.

8. Digital optical switch according to claim 1, 2, or 3 characterized in that the connection of the optical wave guides respectively of the input and output sections proceeds via an intermediate section, in which the optical guides run straight at a very small mutual angle, which intermediate section forms part of the switching section.

9. Digital optical switch comprising:
- a first section, hereinafter called the input section, having a first, incoming, optical wave guide and a second, incoming, optical wave guide, which optical wave guides have a mutually approaching path up to a point within their interaction region,
- a second section, hereinafter called the output section, having at third, outgoing, optical wave guide and a fourth, outgoing, optical wave guide, which optical wave guides have a mutually receding path up to a point outside their interaction region, the optical wave guides of the second section connecting to those of the first section, and
- first means for controllably influencing the light propagation state in at least one of the optical wave guides in one of the sections, the optical wave guides both those in the input section and those in the output section mutually exhibiting in their light propagation state an asymmetry, which asymmetry is controllable by said first means in one of the sections, which is therefore called the switching section, while it is fixed in the other section, which is therefore called the passive section, characterized in that the asymmetry in the passive section is essentially achieved by a curved wave-guide incorporated in one of the optical wave guides of said section.

* * * * *

UNITED STATES PATENT AND TRADEMARK OFFICE
CERTIFICATE OF CORRECTION

PATENT NO. : 5,181,262

DATED : January 19, 1993

INVENTOR(S) : van der Tol et al

It is certified that error appears in the above-identified patent and that said Letters Patent is hereby corrected as shown below:

Title page -

- Item [19] under "United States Patent", Change "Gerardus et al" to --van der Tol et al--.

- Item [75] Inventors: Change "Johannes J. Gerardus" to --Johannes J.G.M. van der Tol--.

Column 2, line 66, change "p.123-1232" to --p.1230-1232--.

Column 3, line 39, the equation, change "$\beta_{eff}\Delta\beta-\beta_1*t/(2R)$" to --$\Delta\beta_{eff} = \Delta\beta-\beta_1*t/(2R)$--

Column 3, line 41, after the word "propagation", insert --constant as a consequence of factors other than the--.

Column 4, line 43, after "central angle", change "8" to --θ--.

UNITED STATES PATENT AND TRADEMARK OFFICE
CERTIFICATE OF CORRECTION

PATENT NO. : 5,181,262
DATED : January 19, 1993
INVENTOR(S) : van der Tol et al It is certified that error appears in the above-identified patent and that said Letters Patent is hereby corrected as shown below:

Column 5, line 29, following "Fig.1.", change

"The switching..." to a new paragraph.

Column 7, line 28, after the words "injection from an", insert --electrode pair installed in position above the "ridge"--.

Column 9, line 1 (claim 7), change "to claim 1" to

--to claim 1, 2, or 3--.

Signed and Sealed this

Eighteenth Day of January, 1994

*Attest:*

BRUCE LEHMAN

*Attesting Officer*     *Commissioner of Patents and Trademarks*